(12) United States Patent
Sunkavally

(10) Patent No.: US 10,872,610 B2
(45) Date of Patent: Dec. 22, 2020

(54) GENERATING RANDOM PASS-PHRASES USING WORD-LEVEL RECURRENT NEURAL NETWORKS

(71) Applicant: RSA Security LLC, Bedford, MA (US)

(72) Inventor: Naveen Sunkavally, Cary, NC (US)

(73) Assignee: RSA Security LLC, Bedford, MA (US)

( * ) Notice: Subject to any disclaimer, the term of this patent is extended or adjusted under 35 U.S.C. 154(b) by 98 days.

(21) Appl. No.: 16/264,303

(22) Filed: Jan. 31, 2019

(65) Prior Publication Data
US 2020/0251118 A1 Aug. 6, 2020

(51) Int. Cl.
*G10L 15/00* (2013.01)
*G10L 15/16* (2006.01)
*G10L 17/24* (2013.01)
*G10L 17/04* (2013.01)
*G10L 17/18* (2013.01)

(52) U.S. Cl.
CPC ............. *G10L 17/24* (2013.01); *G10L 17/04* (2013.01); *G10L 17/18* (2013.01)

(58) Field of Classification Search
None
See application file for complete search history.

(56) References Cited

U.S. PATENT DOCUMENTS

| | | | | |
|---|---|---|---|---|
| 7,962,417 B2 * | 6/2011 | Schull | .................... | G03B 13/02 705/59 |
| 9,225,526 B2 * | 12/2015 | Schneider | ............... | G06F 21/34 |
| 10,116,648 B1 | 10/2018 | Sharma | | |
| 10,678,502 B2 * | 6/2020 | Sheynblat | ................ | H04R 1/46 |
| 10,714,085 B2 * | 7/2020 | Miller | ..................... | G06F 3/167 |
| 2018/0248689 A1 * | 8/2018 | Hu | ........................... | G06F 21/46 |
| 2020/0220869 A1 * | 7/2020 | Singh | .................... | G06F 16/683 |

OTHER PUBLICATIONS

John Clements, "Generating 56-Bit Passwords Using Markov Models (and Charles Dickens)," arXiv:1502.07786v1. Feb. 26, 2015, 5 pages.
Github.com, "Keras-Team/Keras," https://github.com/keras-team/keras/blob/master/examples/lstm_text_generation.py, Aug. 30, 2018, 2 pages.
RSA, "RSA SecurID Suite—Accelerate Business While Managing Identity Risk," RSA Solution Brief, Jul. 2018, 7 pages.

* cited by examiner

*Primary Examiner* — Satwant K Singh
(74) *Attorney, Agent, or Firm* — Danielson Legal LLC

(57) ABSTRACT

Systems and methods are provided for generating random pass-phrases using word-level recurrent neural networks (RNNs). A pass-phrase includes a random sequence of words selected from a text corpus used to train an RNN model. The pass-phrase generation process utilizes a seed phrase obtained from the training text corpus, and a random bit string. The seed phrase is processed by the RNN model to generate a set of predicted words and associated likelihood values that the predicted words are a next word following the seed phrase. The prediction results are encoded into a binary tree which is traversed using a portion of the random bit string to identify a word at a leaf node which matches the portion of the random bit string. The identified word is selected as a constituent of the random pass-phrase, and the process is repeated until the random bit stream is exhausted.

20 Claims, 5 Drawing Sheets

500

GENERATING RANDOM PASS-PHRASES USING WORD-LEVEL RECURRENT NEURAL NETWORKS

FIELD

The field relates generally to techniques for user authentication and, in particular, techniques for generating random pass-phrases for user authentication systems.

BACKGROUND

As information systems continue to become increasingly essential to business and commerce, information systems security becomes increasingly important to prevent or mitigate security threats posed by cyber security breaches and unauthorized access to such information systems by hackers and trespassers looking to sabotage the information systems or steal confidential data. A generally approach to dealing with fraudulent activity has been to employ identity-based authentication systems to verify the identity of users before granting access to an information system and access-controlled resources of the information system. An authentication system verifies user identities by applying authentication methods that require a user to present one or more authentication factors (or alternatively, authenticators) before granting user access to the information system. The authentication factors include, for example, something a user knows (e.g., password), something a user possesses (e.g., one-time passcode token, security token), or something a user is (e.g., biometric).

Knowledge-based authentication factors such as passwords (single word or string of characters) or pass-phrase (multiple words) are commonly used authentication factors. While a higher degree of security is achieved with passwords that are completely random, such passwords are nearly impossible for end users to remember. There are applications (e.g., web browsers) that have a built-in dedicated password manager tool that helps a user generate secure random passwords and store such passwords in encrypted form. While password managers are useful tools, password managers present technical challenges such as synchronizing a user's password across different devices of the user. In addition, password managers are not useful with voice-oriented interfaces, which are rapidly emerging in consumer and enterprise applications. Pass-phrases are an alternative type of knowledge-based authentication factor that provide higher level of user memorability (as compared to random passwords) and work well with voice-oriented interfaces. A random pass-phrase which comprises a plurality of randomly chosen words provides an optimal combination of memorability and security.

SUMMARY

Embodiments of the invention include methods for generating random pass-phrases using word-level recurrent neural networks. For example, one exemplary embodiment of a method for generating a random pass-phrase comprises receiving a request for a random pass-phrase for use as an authentication factor for a registered user to access an information system, and performing an iterative pass-phrase generation process to generate the random pass-phrase in response to the received request. The iterative pass-phrase generation process comprises at least a first iteration which comprises: obtaining an initial seed phrase comprising at least a portion of a text sentence from a text corpus of training data associated with a word-level recurrent neural network (RNN) model trained using the text corpus of training data; obtaining a random bit string having a specified bit-length; inputting the initial seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the initial seed phrase; generating a binary tree data structure representing the prediction results, wherein leaf nodes of the binary tree data structure each correspond to one of the predicted words; traversing the binary tree data structure using a portion of the random bit string to identify a word at a leaf node of the binary tree data structure which matches the portion of the random bit string; and selecting the identified word as a first constituent word of the random pass-phrase.

In another embodiment, the method further comprises: generating a truncated random bit string by removing the portion of the random bit string used to traverse the binary tree data structure to identify the matching word for the first iteration of the pass-phrase generation process; and responsive to determining that the random bit string has not been exhausted following the removal of the portion of the random bit string, performing an additional iteration of the pass-phrase generation process. The additional iteration comprises: modifying the initial seed phrase by appending a previously selected constituent word of the random pass-phrase to an end of the initial seed phrase and removing a first word of the initial seed phrase; inputting the modified seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the modified seed phrase; generating a binary tree data structure representing the prediction results obtained using the modified seed phrase, wherein leaf nodes of the binary tree data structure each correspond to one of the predicted words; traversing the binary tree data structure using a portion of the truncated random bit string to identify a word at a leaf node of the binary tree data structure which matches the portion of the random bit string; and selecting the identified word as a next constituent word of the random pass-phrase. The iterative pass-phrase generation process is terminated when the random bit string has been exhausted, and a random pass-phrase is output, which comprises a sequence of the constituent words selected in all iterations of the pass-phrase generation process.

Other embodiments of the invention include, without limitation, computing systems and articles of manufacture comprising processor-readable storage media for generating random pass-phrases using word-level recurrent neural networks.

DETAILED DESCRIPTION

Embodiments of the invention will be described herein with regard to systems and methods for generating random pass-phrases using word-level recurrent neural networks. The exemplary pass-phrase generation systems and methods described herein allow for automated generation of random pass-phrases with parameters that can be tuned to achieve a desired level of pass-phrase entropy and a desired level of "memorability." The use of word-level recurrent neural networks allow for the generation of memorable pass-phrases that are more akin to natural language while preserving sufficient entropy. In addition, the exemplary pass-phrase generation systems and methods described herein are configured to generate random pass-phrases that do not contain punctuation and are case insensitive, which is suitable for voice-interactive interfaces for user authentication.

Figure 1:
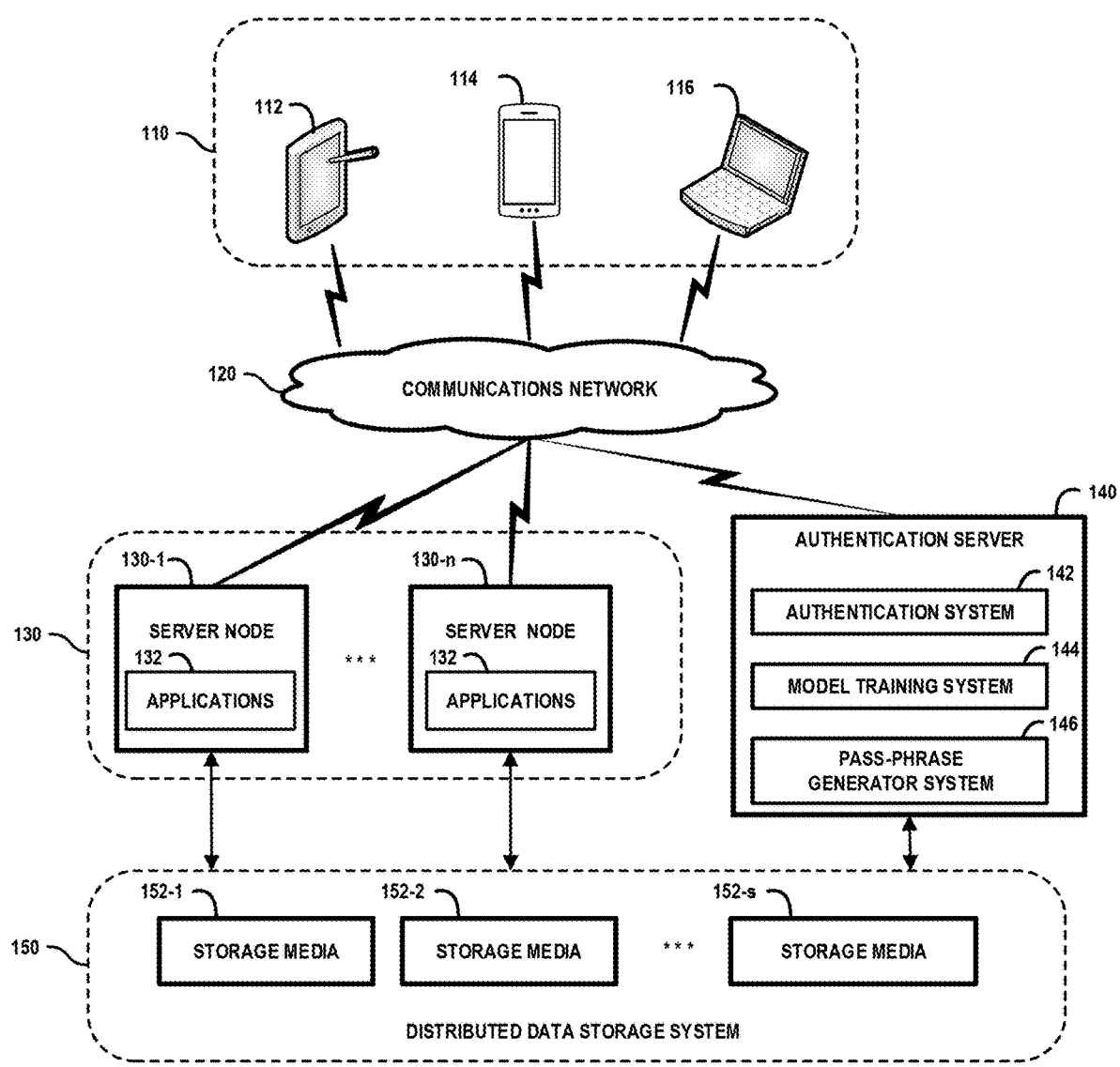
FIG. 1 schematically illustrates an information system comprising an authentication system that is configured to generate random pass-phrases, according to an embodiment of the invention.

FIG. 1 schematically illustrates an information system 100 comprising an authentication system that is configured to provide account recovery according to an embodiment of the invention. The information system 100 comprises user computing devices 110, a communications network 120, a server cluster 130, an authentication server 140, and a data storage system 150. The user computing devices device 110 include, e.g., electronic tablets 112, smart phones 114, laptop computers 116, and other types of computing devices such as desktop computers, personal digital assistants, etc., that enable users, tenants, customers, and other entities to access and utilize data and/or services supported by the information system 100. The server cluster 130 comprises a plurality of application server nodes 130-1, . . . , 130-n, which host one or more applications 132 that are executed across the server cluster 130. The authentication server 140 comprises an authentication system 142, a model training system 144, and a pass-phrase generator system 146, the functions of which will be explained in further detail below. The distributed data storage system 150 comprises plurality of storage media devices 152-1, 152-2, . . . , 152-s (collectively referred to as storage media devices 152), which collectively provide a pool of storage resources that are shared by the application server nodes 130-1, . . . , 130-n and the authentication server 140.

The communications network 120 provides network connections between the computing devices 110, the application server nodes 130-1, . . . , 130-n, and the authentication server 140. The communications network 120 comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the communications network 120 (in some embodiments) comprises combinations of multiple different types of communications networks each comprising network devices configured to communicate using an Internet Protocol (IP) (e.g., TCP/IP) or other communication protocols. The communications network 120 comprises various components such as routers, switches, gateways, bridges, etc., and other elements that form a network backbone to establish communication paths and enable communication between the computing devices 110, the application server nodes 130-1, . . . , 130-n, and the authentication server 140.

The storage media devices 152-1, 152-2, . . . , 152-s comprise persistent storage elements to store data, as well as control circuitry that is configured to control data access operations for storing or accessing data to and from one or more persistent storage elements of the storage media devices 152-1, 152-2, . . . , 152-s. The persistent storage elements can be implemented using one or more different types of persistent storage devices such as HDDs (hard disk drives), flash storage devices (e.g., PCIe flash cards), SSD (solid state drive) devices, or other types and combinations of non-volatile memory. In some embodiments, the storage media devices 152-1, 152-2, . . . , 152-s are configured as a networked-based storage to provide a centralized repository for data that can be stored and accessed by the application server nodes 130-1, . . . , 130-n and the authentication server 140. In one embodiment, the storage media devices 152-1, 152-2, . . . , 152-s can be configured as a storage area network (SAN) (e.g., a virtual SAN implemented using a software-defined storage system such as ScaleIO™) and coupled to the cluster of server nodes 130 and the authentication server 140 using (i) a dedicated switch fabric which is separate from the communications network 120 or (ii) a Converged Ethernet (CE) network which is implemented as part of the communications network 120 to integrate a server and storage network on a same LAN.

The information system 100 may comprise one or more data centers, a cloud computing platform, or any other type of information processing networks, or combinations of computer networks and computing platforms. While FIG. 1 depicts a high-level schematic illustration of the information system 100 for ease of discussion, the information system 100 could include a complex IT infrastructure comprising any combination of logical and physical elements, including, but not limited to, application servers, web servers, storage servers, databases, hardware, software, storage system, and/or networking resources, which are utilized to implement one or more types of information systems for one or more target applications. For example, the information system 100 may comprise any one of various types of information systems including, e.g., operations support systems (e.g., transaction processing system), management information systems, decisions support systems, executive information systems, etc., and other types of information networks that allow shared access to system resources and information (e.g., computers, servers, databases, files, programs, etc.) by a plurality of registered users of the information system.

The authentication server 140 implements methods for authenticating an entity (e.g., user or remote server) that attempts to access the information system 100 (e.g., access the server cluster 130). The authentication server 140 maintains usernames and corresponding authentication factors (e.g., pass-phrases, etc.) of registered users of the information system 100, and executes authentication applications that support user authentication and security token access using various types of authentication tokens. In addition, the authentication server 140 implements access control methods to control access to system resources based on information such as predefined user permissions and company policies that are maintained in databases or directories.

The authentication system 142 of the authentication server 140 implements an authentication process that is configured to control access to resources and services of the information system 100 by verifying the identity of registered users before granting access to the information system 100. The authentication system 142 can implement one or more of various types of known single factor authentication (SFA) systems or multi-factor authentication (MFA) systems. An SFA system implements an authentication process for securing access to the information system 100 by verifying a registered user's identity using a single authentication factor. On the other hand, a MFA system implements an authentication process for securing access to the information system 100 by verifying a registered user's identity using a two or more authentication factors. An authentication factor (alternatively, authenticator) comprises evidence that verifies a user's claimed identity in the form of: (i) knowledge factors (something only the user would know); (ii) possession factors (something only the user possesses), (iii) inherence factors (something the user is); location-based factors (where the user is located), etc.

In particular, knowledge factors are a commonly used form of user authentication in which a user is required to prove knowledge of some secret known to the user in order to authenticate, e.g., a password, a pass-phrase, a personal identification number (PIN), answers to secret questions, a transaction authentication number (TAN), etc. A possession factor comprises a physical object in the possession of the user which is used to authenticate, e.g., a USB stick with a secret token, a bank card, a security key, an authentication token, etc. A possession factor can be a disconnected token or a connected token. A disconnected token does not physically or wirelessly connect to a computing device. The RSA SecurID® token is an example of a disconnected token generator. A disconnected token typically has a built-in screen to display generated authentication data, which is manually typed by the user. Connected tokens are devices that are physically connected to a computing device (e.g., computer) and transmit authentication data automatically, e.g., card readers, wireless tags, USB tokens, etc.

An inherence factor comprises a physical characteristic of the user (e.g. biometric data) which is used to authenticate a user through biometric authentication, e.g., face recognition, voice recognition, fingerprint recognition, iris recognition, etc. In addition, inherence factors include behavioral biometrics such keystroke dynamics (e.g., typing speed, pattern in key press intervals, etc.). Location based factors consider the physical location of the user for purposes of user authentication, e.g., connection to a specific computing network or utilizing a global positioning system (GPS) signal to identify the user's location, etc. For example, while hard wired to a corporate network, a user could be allowed to login to the network using only a PIN, while if the user is remotely accessing the network, the user authentication may require entering an access code generated by a soft token in addition to using the PIN. In this regard, network admission control (e.g., level of network access by a user) can be contingent on the specific network to which the user device is connected, e.g., WI-FI connectivity as compared to wired connectivity.

Other examples of authentication factors include a one-time password (OTP) or passcode which is (i) generated or received by a device (e.g. a security token or smartphone) that only the user possesses or (ii) generated by the system and sent to the registered mobile number or email-id, etc. In addition, a FIDO authenticator with biometric protection can be utilized to support multi-factor cryptographic authentication.

During operation, a registered user that seeks access to an application or service hosted by the server cluster 130 is required to submit an access request to a server within the server cluster 130 using a user computing device 110. The server will respond by sending the request to the authentication server 140 with directions to perform a user authentication process to authenticate the identity of the registered user and also perform other function such as determining a user's level of access to determine if the user is authorized to access data, services or functions as specified in the access request. The authentication server 140 responds to the server request by utilizing the authentication system 142 to perform an authentication process which comprises prompting the user to provide one or more authentication factors, and comparing the authentication factor(s) received from the user against known valid authentication factors of the registered user which can be obtained from an authentication database. The authentication system 142 compares the received response against the correct response and generates an authentication result. The authentication result is sent to the server and the server will grant or deny the access request of the user based on the authentication result.

The model training system 144 and pass-phrase generator system 146 are utilized by the authentication server 140 to generate random pass-phrases, using techniques as discussed herein. The model training system 144 implements methods to train a word-level recurrent neural network (RNN) that is utilized by the pass-phrase generator system 146 to generate a random pass-phrase that includes a plurality of words selected from a text corpus used to train the word-level RNN. As explained in further detail below, the pass-phrase generator system 146 utilizes (i) a random seed phrase (e.g., sentence, partial sentence, etc.) which is obtained from a training text corpus (for a given word-level RNN) and (ii) a random bit string to seed the generation of a random pass-phase that includes words obtained from training text corpus. The memorability and entropy (e.g., bit strength) of the randomly generated pass-phase can be tuned through a "diversity" factor and a bit-length of a random bit string that is used to seed the pass-phrase generation. The random pass-phrases generated by the authentication server 140 can be used as primary authentication factors, as secondary authentication factors, or as OTPs.

Figure 2:
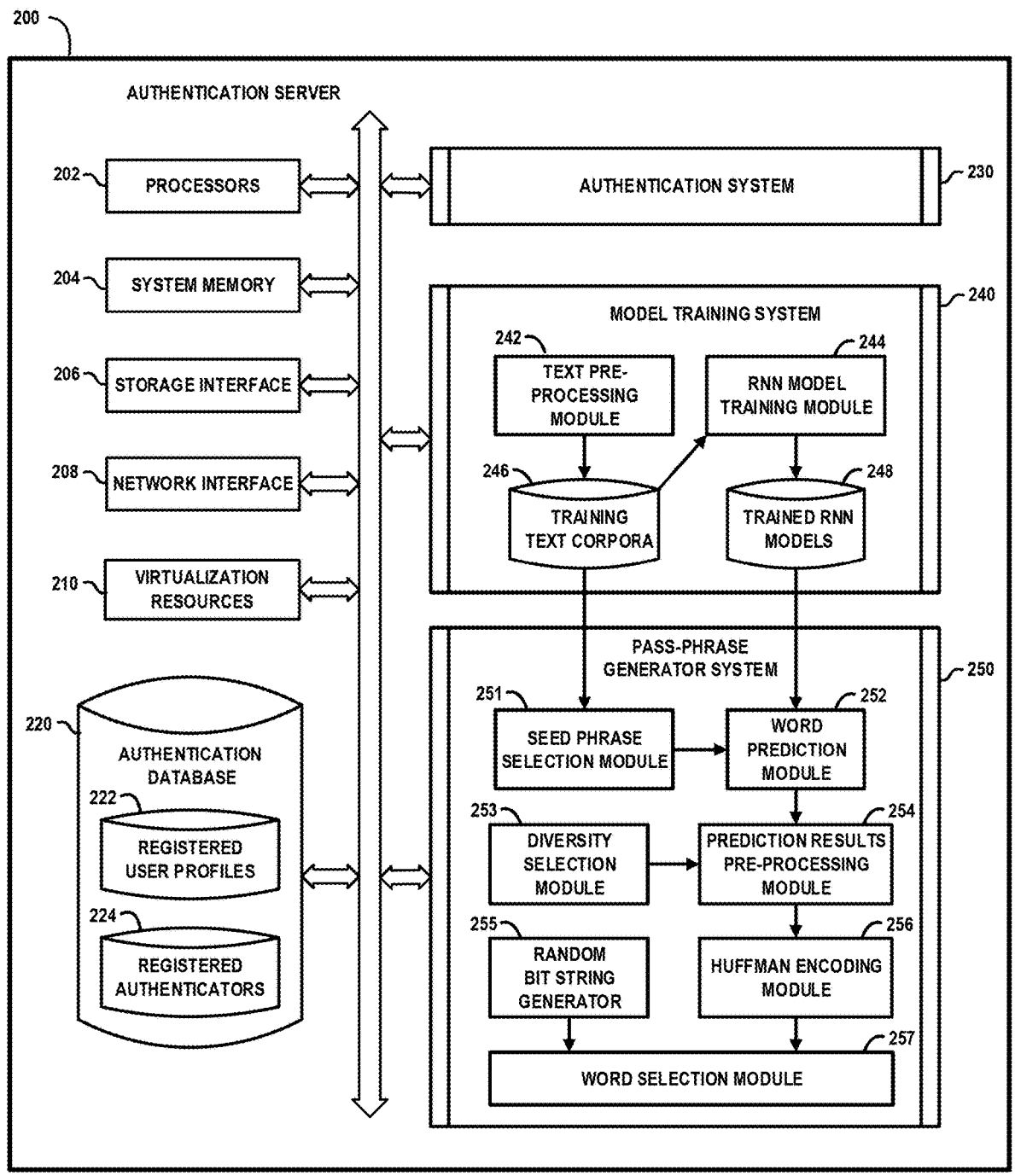
FIG. 2 schematically illustrates an authentication server that is configured to generate random pass-phrases, according to an embodiment of the invention.

FIG. 2 schematically illustrate an authentication server 200 that is configured to generate random pass-phrases according to an embodiment of the invention. For example, FIG. 2 schematically illustrates an exemplary hardware and software architecture of the authentication server 140 of FIG. 1. The authentication server 200 comprises processors 202, system memory 204, a storage interface 206, a network interface 208, virtualization resources 210, an authentication database 220, an authentication system 230, a model training system 240, and a pass-phrase generator system 250. The authentication database 220 comprise a database of registered user profiles 222 and a database of registered authentication factors 224. The model training system 240 comprises a text pre-processing module 242, an RNN model training module 244, a database of training text corpora 246, and a database of trained RNN models 248. The model training system 240 of FIG. 2 illustrates an exemplary embodiment of the model training system 144 of FIG. 1. The pass-phrase generator system 250 comprises a seed phrase selection module 251, a word prediction module 252, a diversity factor selection module 253, a prediction results pre-processing module 254, a random bit string generator 255, a Huffman encoding module 256, and a word selection module 257. The pass-phrase generator system 250 of FIG. 2 illustrates an exemplary embodiment of the pass-phrase generator system 146 of FIG. 1.

The processors 202 comprise one or more types of hardware processors that are configured to process program instructions and data to execute a native operating system and software applications that run on the authentication server 200. For example, the processors 202 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The system memory 204 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 202 to execute the native operating system and other applications hosted by the authentication server 200, and to temporarily store data that is utilized and/or generated by the native operating system and application programs running on the authentication server 200. For example, the volatile memory may be a dynamic random-access memory (DRAM) (e.g., DRAM DIMM (Dual In-line Memory Module), or other forms of volatile RAM. The system memory may comprise non-volatile memory that is configured and accessible as a memory resource. For example, the non-volatile system memory may be one or more of a NAND Flash storage device, an SSD device, or other types of next generation non-volatile memory (NGNVM) devices.

The storage interface circuitry 206 enables the processors 202 to interface and communicate with the system memory 204, and other local storage and off-infrastructure storage media (e.g., data storage system 150, FIG. 1), using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel ATA (PATA), Serial ATA (SATA), Serial Attached SCSI (SAS), Fibre Channel, etc.

The network interface 208 enables the authentication server 200 to interface and communicate with a network and other system components. The network interface circuitry 208 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, direct memory access (DMA) and RDMA data transfer protocols, etc.

The virtualization resources 210 can be instantiated to execute one or more applications or functions which are hosted by the authentication server 200. For example, the virtualization resources 210 can be configured to implement the various modules and functionalities of the authentication system 230, the model training system 240, and the pass-phrase generator system 250 or other applications that execute on the authentication server 200. In one embodiment, the virtualization resources 210 comprise virtual machines that are implemented using a hypervisor platform which executes on the authentication server 200, wherein one or more virtual machines can be instantiated to execute functions of the authentication server 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the authentication server 200, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 210 comprise containers such as Docker containers or other types of Linux containers (LXCs). As is known in the art, in a container-based application framework, each application container comprises a separate application and associated dependencies and other components to provide a complete file system, but shares the kernel functions of the host operating system with the other application containers. Each application container executes as an isolated process in user space of the host operating system. In particular, a container system utilizes the underlying host operating system that provides the basic services to all containerized applications using virtual-memory support for isolation. One or more containers can be instantiated to execute one or more applications, functions or systems of the authentication server 200. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the authentication system 230, the model training system 240, and the pass-phrase generator system 250 (and constituent modules) comprise software that is persistently stored in storage resources (e.g., local storage, or SAN storage, etc.) loaded into the system memory 204, and executed by the processors 202 to perform respective functions as described herein. In this regard, the system memory 204, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The authentication system 230 implements one or more of various types of known single SFA or MFA systems as discussed above to provide controlled access to resources of an information system or information network of a given organization. The authentication system 230 allows users to register with the authentication server 200 to create registered user accounts and establish one or more authentication factors that are used to enable controlled and secured access to resources of an information system of a given organization. The information regarding registered users is maintained in the database of registered user profiles 222 of the authentication database 220. In addition, the registered user profiles 222 are mapped to registered authenticators of the registered users as maintained in the database of registered authenticators 224.

During an authentication process to verify the identity of a registered user seeking access to resources of the information system or information network of the given organization, the authentication system 230 will verify a user ID of the registered user based on information contained in the registered user profiles 222 (e.g., verify that the user has a registered account for secured access to network resources), and compare authentication factor(s) provided by the user against the registered authentication factor(s) of the user (which are mapped to the registered user profile) to authenticate the identity of user as being a registered user.

The model training system 240 is utilized to train one or more word-level RNN models that are used by the pass-phrase generator system 250 to generate a random pass-phrases. The text pre-processing module 242 implements methods that are configured pre-process a raw text corpus by, e.g., removing punctuation characters and converting upper case text to lower case text. In one exemplary embodiment, such pre-processing operations are performed on a raw text corpus to generate a training text corpus from which words can be selected to generate a random pass-phrase that is suitable for voice-interactive interfaces. A raw text corpus preprocessed by the text pre-processing module 242 is stored as a training text corpus in the training text corpora database 246 and utilized by the RNN model training module 244 to train a word-level RNN model. The trained word-level RNN models are stored in the database of trained RNN models 248.

The database of training data 246 can include a plurality a different text corpora and the database of trained RNN models 248 can include a plurality of different RNN models trained on the different training text corpora stored in the database of training data 246. This allows a user to select a desired text corpus from which to generate random pass-phrases for the user. The RNN model training module 244 implements any suitable method known to those of ordinary skill in the art for training a word-level RNN against a given text corpus to allow the trained word-level RNN to predict a next word given a sequence of words (e.g., seed phrase). In one embodiment, the RNN model training module 244 implements method for training a multi-layer RNN model comprising a plurality of activation layers comprising one of (i) long short-term memory (LSTM) units and (ii) gated recurrent units (GRUs) (optimal for natural language understanding) and a fully connected neural network layer comprising a softmax activation function. Details regarding the operations and functionality of the model training system 240 will be explained in further detail below in conjunction with the detailed description of FIG. 3.

While the model training system 240 is depicted as residing in the authentication server 200 for purposes of discussion, it is to be understood that the model training system 240 can be implemented on a remote computing system (e.g., remote server within an information system protected by the authentication server 200). In this instance, the authentication server 200 can access the remote system to access a training text corpus and associated RNN model for use by the pass-phrase generation 250 to generate a random pass-phrase using techniques as described herein.

The pass-phrase generator system 250 is configured to receive a request for a random pass-phrase for use as an authentication factor for a registered user to access an information system that is protected by the authentication server 200, and then perform an iterative pass-phrase generation process to generate the random pass-phrase in response to the received request. The pass-phrase generator system 250 selects a training text corpus (from the database 246) and selects a trained RNN model (from the database 248) which was trained using the selected training text corpus, to perform the pass-phrase generation process. The seed phase selection module 251 is configured to obtain an initial seed phrase comprising at least a portion of a text sentence from the selected text corpus of training data. The diversity selection module 253 is configured select one of a plurality of different diversity factor values, and apply the selected diversity factor to the prediction results pre-processing module 254. The random bit string generator 255 is configured to obtain a random bit string having a specified bit-length, wherein the random bit string is utilized by the word selection module 257 as a seed or key to generate a random pass-phrase using methods as discussed herein.

The word prediction module 252 is configured to perform inference processing using the selected word-level RNN model. In particular, the word prediction module 252 is configured to input a seed phrase (e.g., initial selected seed phrase) to the input of the word-level RNN model to obtain prediction results. The prediction results comprise a plurality of predicted words from the training text corpus and associated likelihood values, wherein the likelihood value for a given predicted word indicates a likelihood that the given predicted word is a next word following the input seed phrase.

The prediction results pre-processing module 254 is configured to pre-process prediction results generated by the word prediction module 254. For example, in one exemplary embodiment, pre-processing comprises selecting subset of the predicted words having the top N likelihood values (e.g., N=256), to thereby limit a number of predicted words (with the N highest likelihood values) used for building a binary tree (which is traversed using portions of the random bit string to select constituent words of the random pass-phrase as discussed below). In addition, pre-processing comprises (i) setting a likelihood value to zero for each predicted word that comprises a stop character, (ii) normalizing the likelihood values of the predicted words, and (iii) applying a diversity factor value as part of the normalizing process, wherein the diversity factor value is applied to achieve a desired level of user memorability of the random pass-phrase to be generated.

The Huffman encoding module 256 is configured to generate a binary tree data structure representing the prediction results (e.g., Huffman tree), wherein leaf nodes of the binary tree data structure each correspond to one of the predicted words. The word selection module 257 is configured to traverse the binary tree data structure using a portion of the random bit string (provided by the random bit string generator module 255) to identify a word at a leaf node of the binary tree data structure which matches the portion of the random bit string, and selecting the identified word as a constituent word of the random pass-phrase to be generated. Details regarding the operations and functionality of the pass-phrase generator system 250 and the constituent modules 251-257 will be explained in further detail below in conjunction with the detailed description of FIGS. 4 and 5.

While the pass-phrase generator system 250 is depicted as residing in the authentication server 200 for purposes of discussion, it is to be understood that the pass-phrase generator system 250 can be implemented on a remote computing system such as a computing device (e.g., phone, laptop, etc.) of a registered user or some computing system other than the authentication server 200. In this instance, the remote computing system can be utilized by a user to generate a personalized pass-phrase for use in registering one or more account for different systems.

By way of example, the pass-phrase generator system 250 can be implemented on a user computing device which implements SecurID token application. As is known in the art, a SecurID token comprises one of many forms including, but not limited to: (i) a software token; (ii) an application program executing on a workstation, installed on a smartcard, or running as a plug-in to a Web browser; or (iii) or hand-held microprocessor-controlled device (e.g., a key fob or standard card). A SecurID token is assigned to a user and creates an authentication code (e.g., tokencode) at fixed intervals (typically every 60 seconds) using a built-in clock and a pre-encoded random key or seed. The seed is different for each SecurID token, and is loaded into a corresponding RSA SecurID server (e.g., RSA Authentication Manager) as tokens are purchased/issued.

To gain access to a protected system, a user will enter a valid SecurID passcode which is comprised of (i) a PIN of the user and (ii) a current tokencode generated (and displayed) by the RSA SecurID token. For example, an application may display a window into which a user enters a PIN, and the software token computes the passcode. With a hand-held RSA SecurID token device, the token device can have a PIN pad which allows a user to enter the user's PIN into the token device to enable the token device to generate a passcode. When the token device has no PIN pad, the passcode is created by concatenating the user's PIN and a tokencode displayed by the token device. A tokencode is a changing number displayed on the key fob. The tokencode is a number generated by the RSA SecurID authenticator at one-minute intervals. A user then enters the PIN and tokencode to authenticate to an authentication server.

A user can authenticate using an RSA SecurID token in response to the user being prompted for a passcode by entering the user's PIN followed by a current tokencode that is currently displayed on the RSA SecurID device. In this instance, the passcode comprises a concatenation of the PIN and the tokencode. When an RSA SecurID token comprises a PIN pad, a user can authenticate using the RSA SecurID PIN pad by entering the user PIN into the PIN pad, and pressing button to generate and present a new passcode on the token. The user can then enter the newly generated passcode in response to being prompted by an authentication server. The user can then proceed to erase the PIN from the token device memory.

In the context of the exemplary embodiments for pass-phrase generation, the passcode generated using a SecurID token can utilized by the random bit string generator 255 to generate a random bit string for use in generating random pass-phrase for a given user. In this instance, the random bit string generator 255 will receiving a passcode from the SecurID token (e.g., a security token device or a soft security token) and the utilize a bit stream representation of the received passcode as the random bit string.

Figure 3:
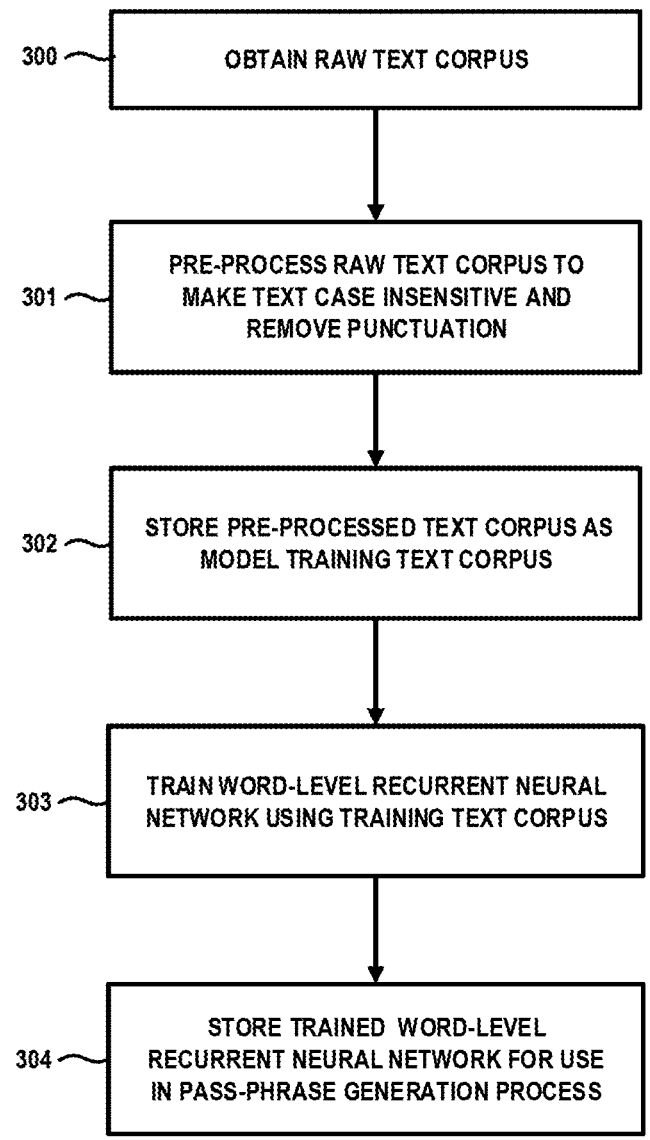
FIG. 3 is a flow diagram of method for training a word-level recurrent neural network model for use in generating random pass-phrase, according to an embodiment of the invention.

FIG. 3 is a flow diagram of method for training a word-level recurrent neural network model for use in generating random pass-phrases, according to an embodiment of the invention. For example, FIG. 3 illustrates a model training process which is implemented by the model training system 240 of FIG. 2. The model training process begins with obtaining a raw text corpus (block 300). The raw text corpus may comprises any suitable text corpus comprising a large collection of unique words (e.g., 5K or more unique words) from which words can be selected to generate random pass-phrases. For example, the raw text corpus can be any source of text including, e.g., the text of a novel, a collection of short stories, an encyclopedia, etc. In one embodiment, the raw text corpus can be selected by a system administrator. In another embodiment, the raw text corpus can be a user-supplied text corpus such as, e.g., a collection of user e-mails acquired over a period of years, a thesis written by the user, etc.

Next, pre-processing is applied to the raw text corpus to make the text case insensitive and to remove punctuation (block 301). In one embodiment, the pre-processing operations are automatically performed by the text-preprocessing module 242 of FIG. 2. In particular, pre-processing is applied to the corpus of raw text to make the text case insensitive by converting all uppercase characters to lowercase characters. Further, pre-processing is applied to remove all punctuation in the raw text except for stop characters (e.g., periods, question marks, exclamation marks). In other embodiments, certain punctuation such as colons and semi-colons can be replaced by periods instead of being completely removed. In addition, the stop characters are separated from the words preceding the stop character to make the stop characters appear as independent words. For instance, the phrase—Jack and Jill went up the hill.—would be converted to—jack and jill went up the hill.—to ensure that any randomly generated pass-phrase would not include the term "hill.".

The pre-processed text corpus is stored as a model training text corpus in a database of training data (block 302). The model training text corpus is utilized to train a word-level RNN model (block 303). The trained word-level RNN model is then stored in a model database for subsequent use in a pass-phrase generation process (block 304). As noted above, the database of training data 246 (FIG. 2) can include a plurality a different text corpora (and associated models) to provide a user choice in selecting a desired text corpus from which to generate random pass-phrases for the user. In addition, the database of training data 246 can include a custom text corpus provided by a user. Further, the database of trained RNN models 248 can include a plurality of different RNN models that are each trained on a corresponding model training text corpus in the training text corpora database 246.

The model training process (in block 303) can be implemented using any suitable method for training a recurrent neural network model, the details of which are well known to those of ordinary skill in the art and not necessary for understanding the pass-phrase generation methods as discussed herein. In addition, any suitable RNN model architecture that generates a prediction in the form of a likelihood/probability across a set of dictionary words (e.g., text corpus) can be implemented for random pass-phrase generation. For example, any suitable multi-layer RNN model architectures comprising two or more activation layers and a fully-connected neural network output layer can be utilized, which takes in an input sequence of words and tries to predict a next word after the input sequence of words. The output of the RNN model comprises a map of each word in a given text corpus dictionary to a probability that the given word is the next word following the input word sequence.

In some embodiments, the activation layers of a word-level RNN model comprise long short-term memory (LSTM) units (e.g., 512 activation units per layer) which are configured to remember values over arbitrary time intervals. In other embodiments, the activation layers of a word-level RNN model comprise gated recurrent units (GRUs). At least one LSTM/GRU layer is utilized within the RNN model architecture to capture long-term relationships between words. A RNN model can be trained for a target number of epochs over a given text corpus to achieve a target categorical cross-entropy loss (e.g., 0.02.) In practice, with a larger text corpus, a more complex model may be required as well as a longer training period.

Figure 4:
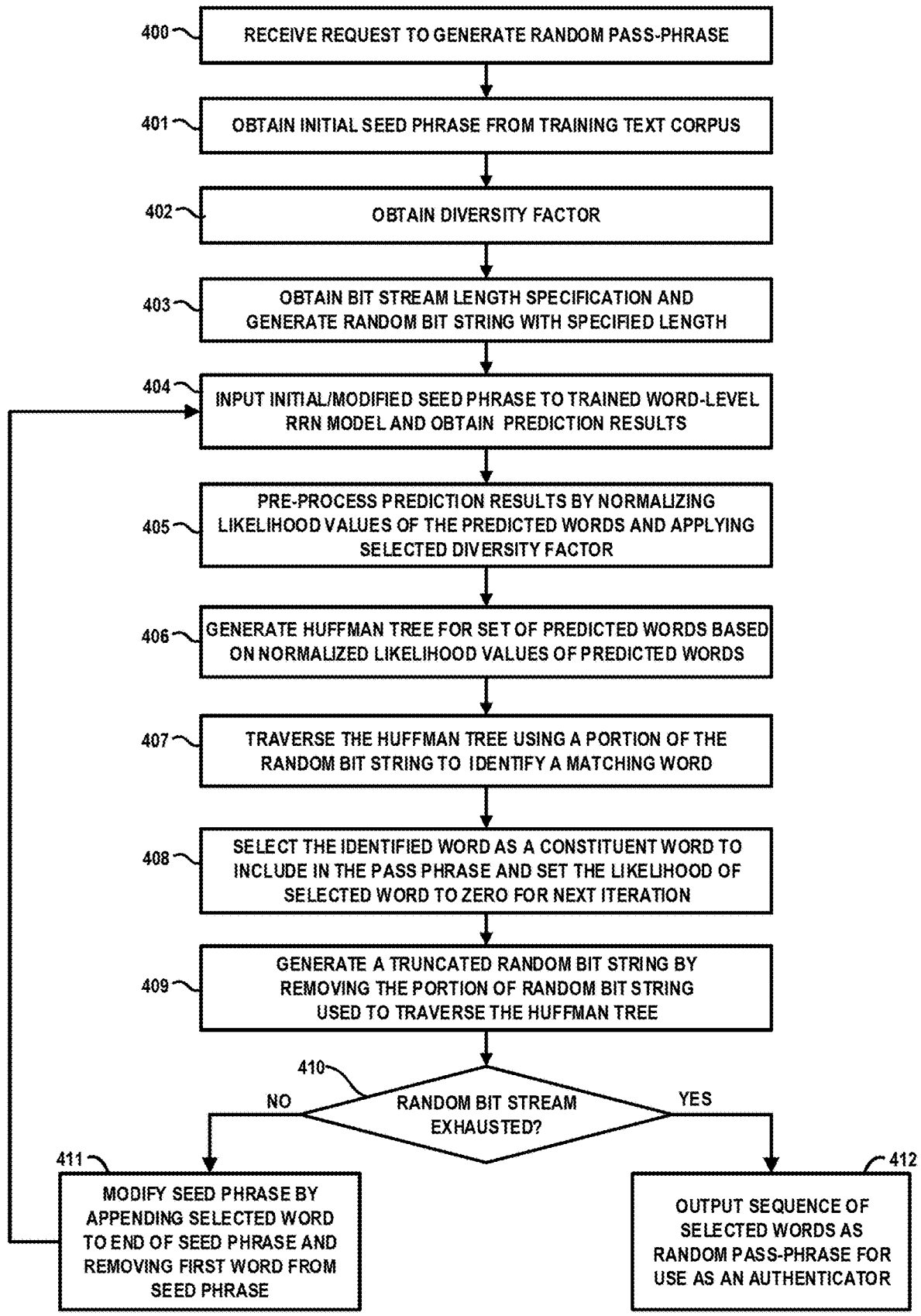
FIG. 4 is a flow diagram of a method for generating a random pass-phrase using a trained word-level recurrent neural network model, according to an embodiment of the invention.

FIG. 4 is a flow diagram of a method for generating a random pass-phrase using a trained word-level recurrent neural network model according to an embodiment of the invention. For example, FIG. 4 illustrates a pass-phrase generation process which is implemented by the pass-phrase generator system 250 of FIG. 2. A pass-phrase generation process is initiated in response to receiving a request to generate a random pass-phrase (block 400). The request may be received from an end user or client application that explicitly requests the authentication server to automatically generate a random pass-phrase. In another embodiment, the request may be generated by the authentication server 200 as part of a user enrollment process in which a user registers with the authentication server 200 and creates, or is otherwise issued, one or more authentication factors including a random pass-phrase.

In some embodiments, the request will specify a target training text corpora to utilize for the pass-phrase generation process. The target training text corpus can be an existing one of a plurality of training text corpora within the database 246 which is explicitly selected by the user in response to being prompted by the system for such selection. In other embodiments, the user/client request may provide, or otherwise specify a location of, a raw text corpus to be used for the pass-phrase generation process. In other embodiments, the system may automatically select a training text corpus to use which is optimal for a given authentication context, or otherwise utilize a pre-specified (e.g., default selection) model training text corpus.

The pass-phrase generator system then proceeds to obtain or generate various parameters or settings that are used for the pass-phrase generation process. For example, the system will obtain an initial seed phrase that exists in the selected model training text corpus (block 401). The initial seed phrase can be randomly chosen as an entire sentence or a portion of a sentence that exists in the selected text corpus. The seed phrase will have a predefined number (n) of words, wherein the number of words matches the number of inputs the word-level RNN model to be used for the pass-phrase generation process. The initial seed phrase can be a random sentence or portion of a sentence in the text corpus that is explicitly selected by the end user, or a predefined sentence or portion of a sentient in the text corpus that is utilized (e.g., by default) by the system for generating random pass-phrases for many users.

In the exemplary pass-phrase generation schemes discussed herein, the seed phrase that is used to generate random pass-phrases does not need to be maintained in confidence, the seed phrase cannot be utilized by an authorized user to reconstruct or otherwise guess a randomly generated pass-phrase of another user that is generated using the known seed phrase. In this regard, the text corpus used to the train the RNN model and the seed sentence used to generate pass-phrases can be provided back to the end-user as a password hint, without compromising the overall security of the solution.

In addition, the system obtains a diversity factor setting (block 402). As noted above, the diversity selection module 253 selects or otherwise sets by default a diversity value that affects the length and 'memorability' of the pass-phrase to be generated. In one embodiment, the diversity factor has a predefined value that is set by a system administrator, and remains fixed for generating random pass-phrases. Low diversity factors favor longer pass-phrases that are more akin to natural language, while large diversity factors favor shorter pass-phrases that are closer to random selections of words from the text corpus. For example, the diversity factor can have one of the following values: 0.2, 1.0, 1.5, 2.0, 2.5, 3.0, 3.5, 4.0, 10.0.

Further, the system obtains a bit stream length parameter and generates a random bit stream having the specified bit stream length (block 403). As noted above, the bit stream length parameter is selected to obtain a desired degree of entropy for the randomly generated pass-phrase to be generated. For example, a random bit string of with a length of 20 bits is equivalent to a 6-digit SecurId OTP. A random bit string with a length of 27 bits is equivalent to a 8-digit SecurId OTP. A random bit string with a length of 37 bits is equivalent to three randomly chosen words from a text corpus containing about unique 4880 words. A random bit string with a length of 50 bits is equivalent to four randomly chose words from a text corpus containing about 4880 unique words.

As noted above, in one exemplary embodiment, the random bit string generator 255 will generate a random bit string having a specified bit length each time a random pass-phrase is to be generated for a given user. In other embodiments, the random bit string generator 255 will generate a random bit string based on a passcode received from a SecurID token.

Next, the seed phrase, diversity factor setting, and random bit string are input to an iterative process that is implemented by the pass-phrase generator system 250 for generating a random sequence words that are selected from the given model training text corpus used for the pass-phrase generation process. In particular, for the initial iteration, the initial seed phrase is applied to the input of a trained RNN model to obtain prediction results (block 404). For illustrative purposes, assume the initial seed phrase comprises a sequence of 8 words: w1, w2, w3, w4, w5, w6, w7, w8 wherein the initial seed phase comprise is a full sentence or a portion of a sentence selected from the training text corpus. The prediction results that are output from the trained RNN model comprises a mapping of each word in the training text corpus to a likelihood value that the given word is the next word following the input word sequence (e.g. the initial seed phase in the first iteration). It is to be noted that the seed phrase should be set once with the RNN model and not changed per run. This guarantees that all generated pass phrases are equally likely and that there isn't collision in generated pass phrases across different seed phrases.

The prediction results output from the RNN model for the given iteration are pre-processed to normalize the likelihood values (block 405). More specifically, pre-processing the prediction results comprises setting the likelihood values of stop characters words to zero (0). This prevents a stop character word from being selected as a pass-phrase word. In addition, in one exemplary embodiment, the likelihood values are normalized using a softmax activation function in the output layer of the RNN model to represent a categorical distribution over class labels (i.e., words of text corpus), and obtaining the probabilities of each of the class labels given the input seed phrase. Essentially, the softmax activation function maps a non-normalized output to a probability distribution over predicted output classes.

In addition, further normalization is achieved by applying the specified diversity factor value to the prediction results. In one embodiment, the diversity factor value is applied to the softmax activation function to adjust the softmax processing results. As noted above, the diversity factor of the softmax activation function can be can be set, for example, to a value in a range from 0 to 10 during a sampling operation for the softmax activation function. A greater diversity factor means that different likelihood values get closer to each other and the predicted word becomes more random. Conversely, decreasing the diversity factor make the prediction more accurate in the sense that the sequence of words that are generated for the pass-phrase are more akin to natural language phrase (as opposed to a more random sequence of words).

Next, a binary tree data structure (e.g., a Huffman tree data structure) is dynamically generated for the set of predicted words based on the normalized likelihood values of the predicted words (block 406). In particular, in one exemplary embodiment, a Huffman encoding process is applied to the normalized prediction results to generate a Huffman tree data structure comprising a binary tree of nodes in which a root node and each internal node has two children (referred to as left child and right child) and wherein each leaf node represents one of the predicted words in the current prediction results. For purposes of discussion, FIG. 5 is an illustrative embodiment of a Huffman tree data structure 500 which is generated and utilized in a process flow for generating a random pass-phrase, according to an embodiment of the invention.

Figure 5:
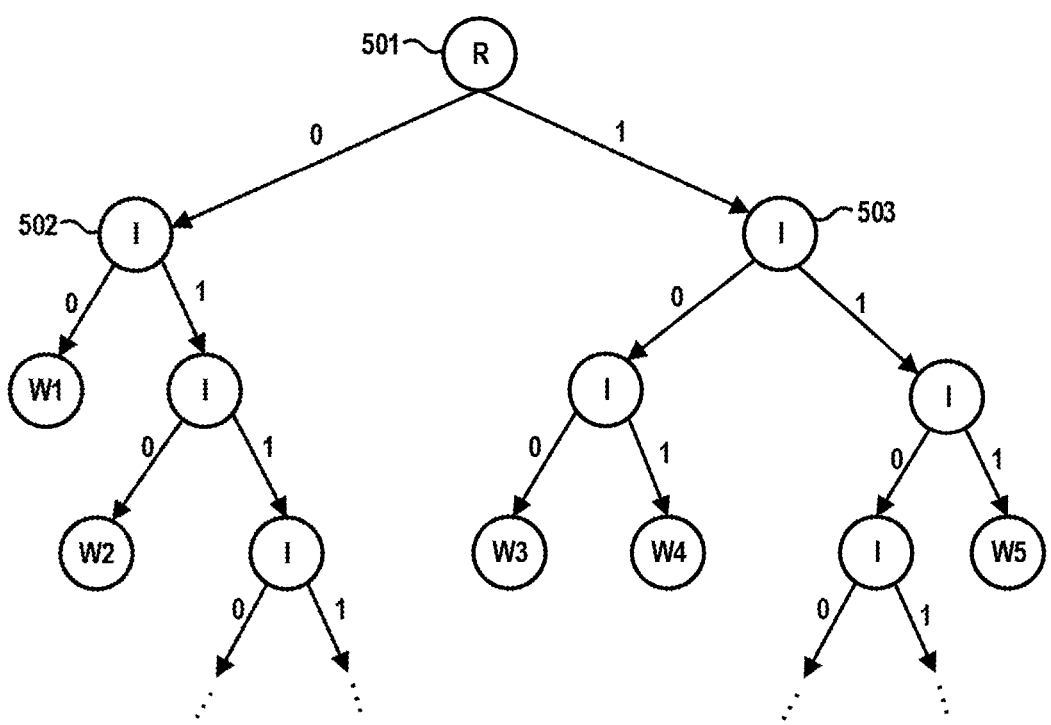
FIG. 5 is an illustrative embodiment of a binary tree data structure which is generated and utilized in a process flow for generating a random pass-phrase, according to an embodiment of the invention.

In particular, FIG. 5 illustrates a portion of a Huffman tree data structure 500 comprising a root node (R) 501, a plurality of internal nodes (I), and a plurality of leaf nodes that represent predicted words W1, W2, W3, W4, and W5. The leaf nodes contain the normalized likelihood values of the predicted word they represent. The root node 501 comprises two child nodes 502 and 502 (which are internal nodes (I)) and each internal node (I) comprises two child nodes and a link to a parent node. For example, the internal node 502 comprises a leaf node W1 (left child) and an internal (I) node (right child) and a link to a parent node (e.g., the root node 501). As further shown in FIG. 5, the root node 501 and each internal node (I) has a link to a left child node and a link to a right child node, wherein as a common convention, bit "0" represents a link following to the left child node and bit "1" represents a link following to the right child node. The Huffman tree data structure 500 can be generated using any suitable methodology, the details of which are well known to those of ordinary skill in the art and not necessary for understanding the pass-phrase generation methods as discussed herein.

The pass-phrase generation process continues with match traversing the Huffman tree data structure using at least a portion of the random bit string to identify a matching word (block 407). For example, the Huffman tree 500 shown in FIG. 5 provides a Huffman code for each word (i.e., leaf node) based on the sequence of bit values (0 and 1) in the tree data structure along a root-to-leaf path for the given word. In particular, in the exemplary embodiment shown in FIG. 5, the encoding for word W1 is 00, the encoding for word W2 is 010, the encoding for word W3 is 100, the encoding for word W4 is 101, and the encoding for word W5 is 111. Assume that the randomly generated bit stream comprises a 20-bit length stream as follows: 01010111000110011101. In this illustrative embodiment, the match traversal process (block 407) would start from the beginning of the random bit string and traverse the Huffman tree 500 beginning at the root node 501, taking the left-hand path of for a "0" bit and a right-hand path for a "1" until a leaf node (i.e. word) is reached. In this example, since the first three bits of the random bit string are 010, the match traversal process for this iteration of the process would identify W1 as a matching word, since the Huffman encoding for word W1 in the tree data structure is 010.

Referring again to FIG. 4, the identified word (e.g., word W1) is selected as a constituent word to include as part of the random sequence of words for the pass-phrase, and a likelihood value of the selected word is set to zero (0) for the next iteration (block 408). This ensures that selected word (e.g., W1) for the current iteration of the pass-phrase generation process is not selected in a subsequent iteration of the pass-phrase generation process, and thus, ensures that the pass-phrase which is generated does not have repeated words.

The process continues with generating a truncated random bit string by removing the portion of the random bit string, which was used to traverse the Huffman tree to identify the matching word for the current iteration (block 409). For example, for the 20-bit length stream 01010111000110011101, the first three bits 010 first three bits of the random bit string (corresponding to selected word W1) would be removed from the random bit string, leaving the remaining portion of the bit string as 10111000110011101 as a truncated random bit string to be used for the next iteration of the pass-phrase generation process.

After each iteration, a determination is made as to whether the random bit string has been exhausted by the removal of the portion of the random bit string (block 410). If the random bit string has not been exhausted (negative determination in block 410), the current seed phrase is modified by appending the selected word to the end of the current seed phase and removing a first word of the current seed phrase (block 411). For example, in the above example where it is assumed that the initial seed phrase comprises a sequence of 8 words: w1, w2, w3, w4, w5, w6, w7, w8, and where the word W1 was selected in the first iteration for the random pass-phrase, the current seed phrase (e.g., the initial seed phrase) would be modified by removing the first word w1 and appending the selected word W1 to the end of the current seed phrase to generate the following modified (8-word) seed phrase w2, w3, w4, w5, w6, w7, w8, W1.

The next iteration of the pass-phrase generation process is then performed (return to block 404) by inputting the modified seed phrase to the trained word-level RNN mode, and obtaining prediction results based on the modified seed phrase. The process flow (of block 405, 406, 407, 408, 409 is then repeated using a new dynamically generated Huffman tree (which is generated based on the new prediction results that are obtained based on the modified seed phrase and traversing the new Huffman tree using the remaining portion of the random bit string. After the entire random bit string has been utilized for traversing dynamically generated Huffman trees and selecting words in the iterative process (affirmative determination in block 410), the sequence of selected words is output as the randomly generated pass-phrase for use as an authentication factor.

During a given iteration of the pass-phrase generation process, a circumstance can arise where the current truncated bit stream has a small number of remaining bits such that a root-to-leaf traversal of current Huffman tree using the remaining bits does not reach (or match) a leaf node. In the case where the traversal of the Huffman tree in the direction of the remaining bits ends on an internal node A (not a leaf node), the system can deterministically select a leaf node that is a subnode of the internal node A. For instance, the system can always select the left most node(s) in the subtree spanned by the internal node A to reach a leaf node (e.g., add a sequence of one or more "0s" to the end of the remaining bits to reach a leaf node). Alternatively, the system can always select the right most node(s) in the subtree spanned by the internal node A to reach a leaf node (e.g., add a sequence of one or more "1s" to the end of the remaining bits to reach a leaf node).

Both cases are tantamount to adding a deterministic set of bits to the end of the random bit string. The choice between selecting the left most or right most nodes to reach a leaf node does not matter—what matters is that the selection is consistent so that the same random bit string generates the same pass-phrase at all times using the same seed phrase and RNN model—otherwise the authentication server would not be able to reconstruct the exact same pass-phrase at the time a user is authenticating. For example, when an authentication token (e.g., SecurID) executing on a user computing device generates a random pass-phrase using the method of FIG. 4, and transmits the random pass-phrase to an authentication server, the authentication server can use the same random bit string, seed phrase and RNN model utilized by the authentication token to regenerate the random pass-phrase, and compare the pass-phrase provided by authentication token of the computing device with the regenerated pass-phrase by the authentication server for purposes of user authentication.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:

receiving a request for a random pass-phrase for use as an authentication factor for a registered user to access an information system;

performing an iterative pass-phrase generation process to generate the random pass-phrase in response to the received request, wherein the iterative pass-phrase generation process comprises at least an first iteration which comprises:

obtaining an initial seed phrase comprising at least a portion of a text sentence from a text corpus of training data associated with a word-level recurrent neural network (RNN) model trained using the text corpus of training data;

obtaining a random bit string having a specified bit-length;

inputting the initial seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the initial seed phrase;

generating a binary tree data structure representing the prediction results, wherein leaf nodes of the binary tree data structure each correspond to one of the predicted words;

traversing the binary tree data structure using a portion of the random bit string to identify a word at a leaf node of the binary tree data structure which matches the portion of the random bit string; and selecting the identified word as a first constituent word of the random pass-phrase.

2. The method of claim 1, further comprising:

generating a truncated random bit string by removing the portion of the random bit string used to traverse the binary tree data structure to identify the matching word for the first iteration of the pass-phrase generation process; and responsive to determining that the random bit string has not been exhausted following the removal of the portion of the random bit string, performing an additional iteration of the pass-phrase generation process, wherein the additional iteration comprises:

modifying the initial seed phrase by appending a previously selected constituent word of the random pass-phrase to an end of the initial seed phrase and removing a first word of the initial seed phrase;

inputting the modified seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the modified seed phrase;

generating a binary tree data structure representing the prediction results obtained using the modified seed phrase, wherein leaf nodes of the binary tree data structure each correspond to one of the predicted words;

traversing the binary tree data structure using a portion of the truncated random bit string to identify a word at a leaf node of the binary tree data structure which matches the portion of the random bit string; and selecting the identified word as a next constituent word of the random pass-phrase.

3. The method of claim 2, comprising:

terminating the pass-phrase generation process responsive to determining that the random bit string has been exhausted; and outputting a random pass-phrase comprising a sequence of the constituent words selected in all iterations of the pass-phrase generation process.

4. The method of claim 1, wherein generating the binary tree data structure representing the prediction results comprises performing a Huffman encoding process to generate a Huffman tree data structure.

5. The method of claim 1, wherein traversing the binary tree data structure comprises performing a root node-to-leaf node path traversal based on a sequence of bit values at a beginning portion of the random bit string.

6. The method of claim 1, wherein obtaining the random bit string having a specified bit-length comprises:

receiving a passcode from one of a (i) security token device and (ii) a soft security token; and utilizing a bit stream representation of the received passcode as the random bit string.

7. The method of claim 1, further comprising pre-processing the prediction results prior to generating the binary tree data structure representing the prediction results, wherein pre-processing comprises normalizing the likelihood values of the predicted words.

8. The method of claim 7, wherein pre-processing comprising applying a diversity factor value as part of the normalizing process, wherein the diversity factor value is applied to achieve a desired level of user memorability of the random pass-phrase to be generated.

9. The method of claim 7, wherein pre-processing comprises setting a likelihood value to zero for a predicted word that comprises a stop character.

10. The method of claim 1, wherein an iterative pass-phrase generation process is performed by an authentication server of the information system.

11. The method of claim 1, wherein the iterative pass-phrase generation process is executed on a computing device of the registered user.

12. The method of claim 1, wherein the text corpus of training data is obtained by pre-processing a raw text corpus to generate the text corpus of training data, wherein pre-processing the raw text corpus comprises:

converting uppercase text characters in the raw text corpus to lower-case characters; and removing punctuation characters from the raw text except for stop characters;

separating the stop characters from text words preceding the stop characters to make the stop characters appear as independent words in the raw text corpus.

13. The method of claim 12, further comprising training the word-level RNN model using the text corpus of training generated as a result of the pre-processing of the raw text corpus, wherein training the word-level RNN model comprising training a multi-layer RNN model comprising a plurality of activation layers comprising one of (i) long short-term memory (LSTM) units and (ii) gated recurrent units (GRUs).

14. An article of manufacture comprising a non-transitory processor-readable storage medium having stored therein program code of one or more software programs, wherein the program code is executable by one or more processors to perform a method which comprises:

receiving a request for a random pass-phrase for use as an authentication factor for a registered user to access an information system;

performing an iterative pass-phrase generation process to generate the random pass-phrase in response to the received request, wherein the iterative pass-phrase generation process comprises at least an first iteration which comprises:

obtaining an initial seed phrase comprising at least a portion of a text sentence from a text corpus of training data associated with a word-level recurrent neural network (RNN) model trained using the text corpus of training data;

obtaining a random bit string having a specified bit-length;

inputting the initial seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the initial seed phrase;

generating a binary tree data structure representing the prediction results, wherein leaf nodes of the binary tree data structure each correspond to one of the predicted words;

traversing the binary tree data structure using a portion of the random bit string to identify a word at a leaf node of the binary tree data structure which matches the portion of the random bit string; and selecting the identified word as a first constituent word of the random pass-phrase.

15. The article of manufacture of claim 14, wherein the program code is executable by the one or more processors to perform a method which further comprises:

generating a truncated random bit string by removing the portion of the random bit string used to traverse the binary tree data structure to identify the matching word for the first iteration of the pass-phrase generation process; and responsive to determining that the random bit string has not been exhausted following the removal of the portion of the random bit string, performing an additional iteration of the pass-phrase generation process, wherein the additional iteration comprises:

modifying the initial seed phrase by appending a previously selected constituent word of the random pass-phrase to an end of the initial seed phrase and removing a first word of the initial seed phrase;

inputting the modified seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the modified seed phrase;

generating a binary tree data structure representing the prediction results obtained using the modified seed phrase, wherein leaf nodes of the binary tree data structure each correspond to one of the predicted words;

traversing the binary tree data structure using a portion of the truncated random bit string to identify a word at a leaf node of the binary tree data structure which matches the portion of the random bit string; and selecting the identified word as a next constituent word of the random pass-phrase.

16. The article of manufacture of claim 15, wherein the program code is executable by the one or more processors to perform a method which further comprises:

terminating the pass-phrase generation process responsive to determining that the random bit string has been exhausted; and outputting a random pass-phrase comprising a sequence of the constituent words selected in all iterations of the pass-phrase generation process.

17. The article of manufacture of claim 14, wherein the program code is executable by the one or more processors to perform a method which further comprises pre-processing the prediction results prior to generating the binary tree data structure representing the prediction results, wherein pre-processing comprises:

setting a likelihood value to zero for each predicted word that comprises a stop character;

normalizing the likelihood values of the predicted words; and applying a diversity factor value as part of the normalizing process, wherein the diversity factor value is applied to achieve a desired level of user memorability of the random pass-phrase to be generated.

18. A system, comprising:

memory to store software instructions; and one or more processors to execute the software instructions to perform a method which comprises:

receiving a request for a random pass-phrase for use as an authentication factor for a registered user to access an information system;

performing an iterative pass-phrase generation process to generate the random pass-phrase in response to the received request, wherein the iterative pass-phrase generation process comprises at least an first iteration which comprises:

obtaining an initial seed phrase comprising at least a portion of a text sentence from a text corpus of training data associated with a word-level recurrent neural network (RNN) model trained using the text corpus of training data;

obtaining a random bit string having a specified bit-length;

inputting the initial seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the initial seed phrase;

generating a binary tree data structure representing the prediction results, wherein leaf nodes of the binary tree data structure each correspond to one of the predicted words;

traversing the binary tree data structure using a portion of the random bit string to identify a word at a leaf node of the binary tree data structure which matches the portion of the random bit string; and selecting the identified word as a first constituent word of the random pass-phrase.

19. The system of claim 18, wherein the one or more processors execute the software instructions to perform a method which further comprises:

generating a truncated random bit string by removing the portion of the random bit string used to traverse the binary tree data structure to identify the matching word for the first iteration of the pass-phrase generation process; and responsive to determining that the random bit string has not been exhausted following the removal of the portion of the random bit string, performing an additional iteration of the pass-phrase generation process, wherein the additional iteration comprises:

modifying the initial seed phrase by appending a previously selected constituent word of the random pass-phrase to an end of the initial seed phrase and removing a first word of the initial seed phrase;

inputting the modified seed phrase to the input of the word-level RNN model to obtain prediction results, wherein the prediction results comprises a plurality of predicted words from the text corpus and associated likelihood values, wherein the likelihood value for a given predicted word indicates a likelihood that the given predicted word is a next word following the modified seed phrase;

generating a binary tree data structure representing the prediction results obtained using the modified seed phrase, wherein leaf nodes of the binary tree data structure each correspond to one of the predicted words;

traversing the binary tree data structure using a portion of the truncated random bit string to identify a word at a leaf node of the binary tree data structure which matches the portion of the random bit string; and selecting the identified word as a next constituent word of the random pass-phrase.

20. The system of claim 18, wherein the system comprises one of (i) a computing device of the registered user and (ii) an authentication server of the information system.

* * * * *